United States Patent
Conrad et al.

(10) Patent No.: US 8,255,410 B2
(45) Date of Patent: Aug. 28, 2012

(54) TRANSLATING QUERIES TO REPRESENTATIONAL STATE TRANSFER (REST)

(75) Inventors: Andrew Conrad, Sammamish, WA (US); Pablo Castro, Redmond, WA (US); Michael Flasko, Duvall, WA (US); Colin Meek, Redmond, WA (US); Simon Cavanagh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 12/412,544

(22) Filed: Mar. 27, 2009

(65) Prior Publication Data

US 2010/0145946 A1    Jun. 10, 2010

Related U.S. Application Data

(60) Provisional application No. 61/120,991, filed on Dec. 9, 2008.

(51) Int. Cl.
*G06F 17/30* (2006.01)
(52) U.S. Cl. .................. 707/761; 707/763; 707/E17.07
(58) Field of Classification Search .................. 707/736, 707/E17.025, E17.07, 761, 763
See application file for complete search history.

(56) References Cited

U.S. PATENT DOCUMENTS

| | | | |
|---|---|---|---|
| 2003/0172059 A1* | 9/2003 | Andrei | 707/3 |
| 2006/0069995 A1 | 3/2006 | Thompson et al. | |
| 2006/0282422 A1* | 12/2006 | Al-Omari | 707/4 |
| 2008/0065590 A1 | 3/2008 | Castro et al. | |
| 2008/0201338 A1 | 8/2008 | Castro et al. | |
| 2008/0243764 A1 | 10/2008 | Meijer et al. | |
| 2008/0263063 A1 | 10/2008 | Sceppa et al. | |
| 2008/0319957 A1 | 12/2008 | Muralidhar et al. | |

OTHER PUBLICATIONS

Marqueire et al., LINQ in Action, Feb. 11, 2008, Manning Publications, pp. 1-16.*
Warren, LINQ: Building an IQueryable Provider, 2007, pp. 1-5.*
Raiko, Modifying LINQ Expressions with Rewrite Rules, Mar. 18, 2008, pp. 1-20.*
Flasko, et al. "Expose and Consume Data in a Web Services World", retrieved from <http://msdn.microsoft.com/en-us/magazine/dvdarchive/cc748663.aspx> on Mar. 3, 2009, 13 pages.
"Using Microsoft ADO.NET Data Services", retrieved from <http://msdn.microsoft.com/en-us/library/cc907912.aspx> on Mar. 3, 2009, (Published: Aug. 2008), 51 pages.
Jennings, "Manipulate Data in the Cloud with ADO.NET", retrieved from <http://redmondmag.com/features/article.asp?EditorialsID=2469> on Mar. 3, 2009, (Published May 2008), 6 pages.
WCF Data Services, retrieved from <http://en.wikipedia.org/wiki/ADO.NET_Data_Services> on Mar. 3, 2012, 3 pages.
Language Integrated Query, retrieved from <http://en.wikipedia.org/wiki/LINQ> on Mar. 3, 2012, 11 pages.

* cited by examiner

*Primary Examiner* — John E Breene
*Assistant Examiner* — Albert Phillips, III

(57) ABSTRACT

Query expressions, such as LINQ (language integrated queries) queries, are enabled to be translated to URIs (uniform resource indicators) that may be used to query data sources at REST (representational state transfer) interfaces. A compiler is configured to convert a query into an expression tree. An expression tree normalizer is configured to normalize the expression tree into a normalized expression tree. A resource bound expression tree generator is configured to transform the normalized expression tree into a resource bound expression tree. A URI generator is configured to translate the resource bound expression tree into a URI.

20 Claims, 14 Drawing Sheets

TRANSLATING QUERIES TO REPRESENTATIONAL STATE TRANSFER (REST)

This application claims the benefit of U.S. Provisional Application No. 61/120,991, filed on Dec. 9, 2008, which is incorporated by reference herein in its entirety.

BACKGROUND

Computer systems may be coupled together in various ways to enable communications between them, including being coupled together in networks such as local area networks (LANs), wide area networks (WANs), or combinations of networks, such as the Internet. Data may be transferred (e.g., copied or moved) between computer systems in various ways. For instance, an application executing at a first computer system may generate a query, which is a request for particular data. The query may be transmitted to a second computer system, which contains or has access to a data source containing the desired data. The second computer system responds to the query by transmitting the requested data to the first computer system.

Currently, applications and services are being developed with a common set of characteristics that are similar to those that enable the scale of the World Wide Web. These characteristics include the use of REST (representational state transfer) interfaces for accessing resources, a URI (Uniform Resource Identifier) namespace that identifies the resources, simple payload formats or representations, and a stateless request-response interaction model. These applications and services enable web-based data sources to be accessed in a more efficient manner.

An example of such an application is the Microsoft® .NET Framework published by Microsoft Corporation of Redmond, Wash. The .NET Framework is a software framework providing a large library of coded solutions. The ADO.NET Data Services of the .NET Framework provide rules to expose an HTTP (hypertext transfer protocol) interface for a data source to receive queries, as well as an implementation of those rules in the form of a library or framework that developers may use to create services. Data of such a data source can be accessed through such an interface using URIs.

Language integrated query (LINQ) is a Microsoft® .NET Framework component that add querying capabilities to programming languages supported by the .NET Framework. When compiled, LINQ queries are converted into an expression tree. The expression tree is subsequently converted into a query that is understandable to a particular targeted datastore. This conversion is performed on a datastore-by-datastore basis, which requires additional effort and increases system complexity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products for querying data sources in a standardized manner are described herein. Query expressions, such as in the form of LINQ (language integrated queries) queries, are enabled to be translated to URIs (uniform resource indicators). The URIs may be used to query data sources having standardized communication interfaces, such as REST (representational state transfer) interfaces. As such, embodiments enable queries to be issued from a wide variety of programming languages in a standardized fashion, to enable resources to be accessed in a more uniform manner at standard data source interfaces.

In a first implementation, a method for translating queries to URIs is provided. An expression tree that is representative of a query is normalized into a normalized expression tree. The normalized expression tree is transformed into a resource bound expression tree. The resource bound expression tree is translated into a uniform resource indicator (URI). In a further example implementation of the method, program code that includes a query (such as a LINQ query) may be compiled to generate the expression tree representative of the query.

In a further implementation, the normalizing may include one or more of: removing a redundant first portion of the expression tree, removing a second portion of the expression tree that is not relevant to a data source to which the query is directed, modifying a third portion of the expression tree into a canonical form, and/or evaluating a sub-expression of the expression tree.

Still further, the transforming may include one or more of: mapping a first sub-expression of the normalized expression tree to a first (e.g., path) URI component, mapping a second sub-expression of the normalized expression tree to a second (e.g., query option) URI component, and/or validating the first and second URI components. The validating may include determining whether each URI component mapped from a sub-expression of the normalized expression tree is a legal addition to the resource bound expression tree, and enabling the translating to be performed if each URI component is determined to be a legal addition to the resource bound expression tree. The validating may further include indicating an error if at least one URI component is determined to not be a legal addition to the resource bound expression tree.

Furthermore, the resource bound expression tree may be modified into a revised resource bound expression tree if at least one URI component is determined to not be a legal addition to the resource bound expression tree. The revised resource bound expression tree includes at least one revised sub-expression corresponding to a URI component determined to not be a legal addition to the resource bound expression tree.

In another implementation, a query-to-URI translator system is provided. The query-to-URI translator system includes an expression tree normalizer, a resource bound expression tree generator, and a URI generator. The expression tree normalizer is configured to normalize an expression tree that is representative of a query into a normalized expression tree. The resource bound expression tree generator is configured to transform the normalized expression tree into a resource bound expression tree. The URI generator is configured to translate the resource bound expression tree into a URI. The query-to-URI translator system may optionally include a compiler that is configured to convert a query, such as a LINQ query, into the expression tree representative of the query.

Computer program products are also described herein for translating queries to URIs, and for further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 15:
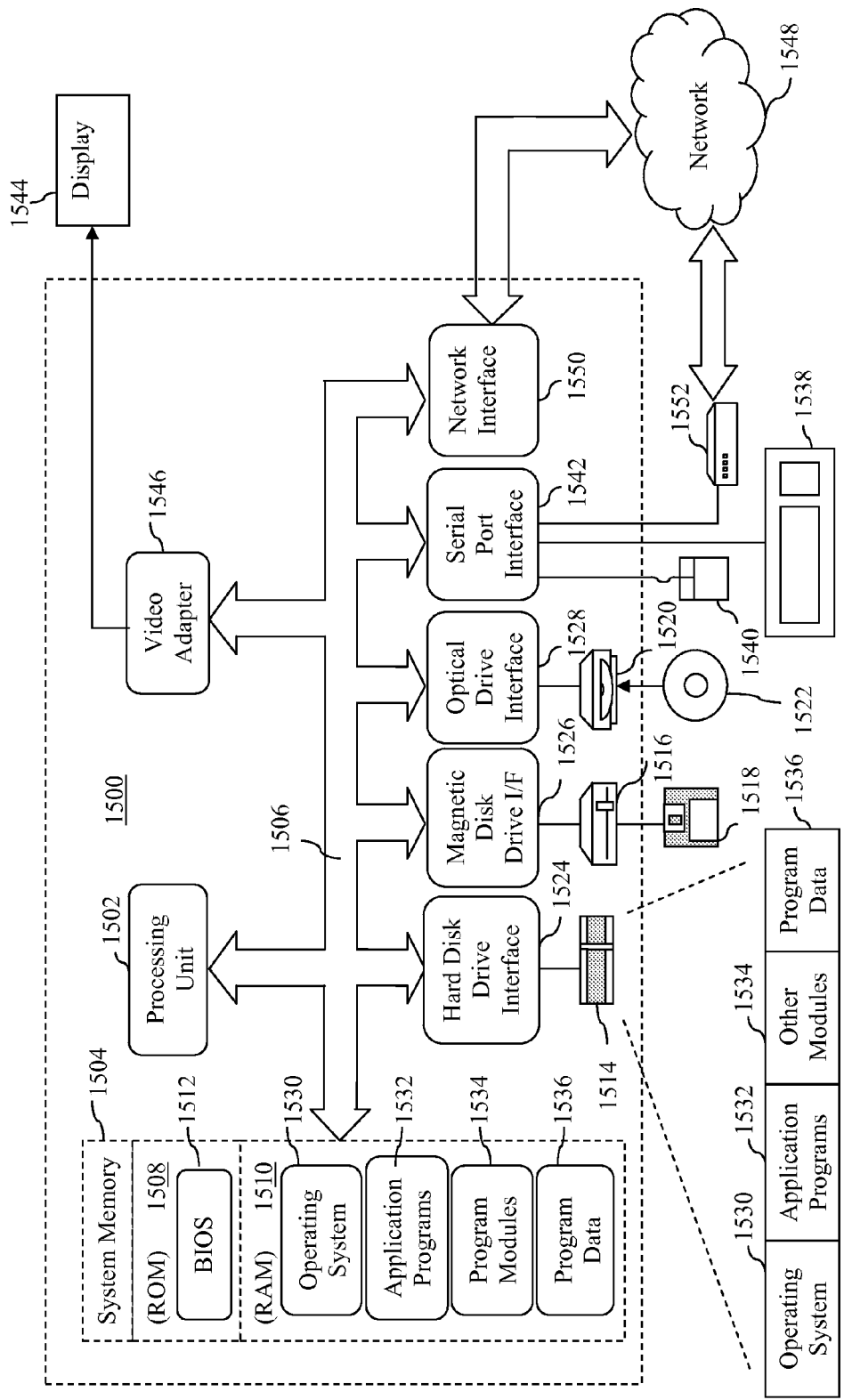

FIG. 15 shows a block diagram of an example computer that may be used to implement embodiments of the present invention of the present invention The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Data Communication Systems

Figure 1:
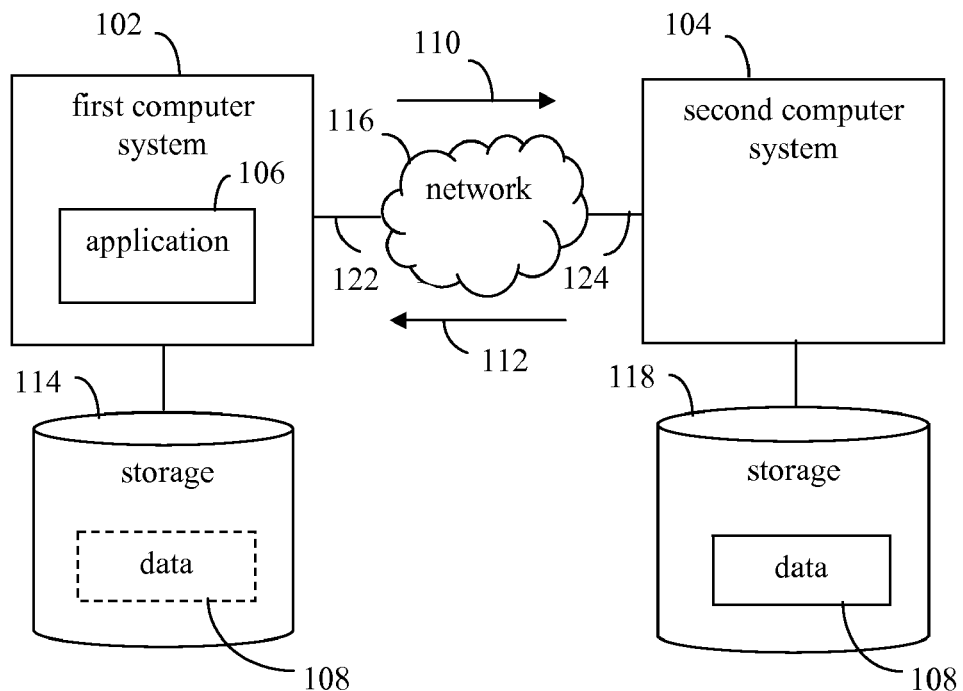
FIG. 1 shows a block diagram of a data communication system, according to an example embodiment of the present invention.

Embodiments of the present invention relate to data communications in distributed systems. For example, FIG. 1 shows a block diagram of a data communication system 100, according to an example embodiment. As shown in FIG. 1, system 100 includes a first computer system 102, a second computer system 104, a first storage 114, a network 116, and a second storage 118. An application 106 executes in first computer system 102. Storage 114 is coupled to first computer system 102. Storage 118 is coupled to second computer system 104. First and second computer systems 102 and 104 are communicatively coupled by network 116. System 100 is configured to enable resources to be transferred between first and second computer systems 102 and 104.

First and second computer systems 102 and 104 may each be any type of computing device, including a desktop computer (e.g., a personal computer), a server, a mobile computer or computing device (e.g., a Palm® device, a RIM Blackberry® device, a personal digital assistant (PDA), a laptop computer, a notebook computer, etc.), or other type of computer system. Storage 114 and storage 118 may each include one or more of any type of storage mechanism to store content (e.g., objects), including a hard disk drive, an optical disc drive, a memory device such as a RAM device, a ROM device, etc., and/or any other suitable type of storage medium.

Network 116 may include one or more communication links and/or communication networks, such as a PAN (personal area network), a LAN (local area network), a WAN (wide area network), or a combination of networks, such as the Internet. First and second communication links 122 and 124, which respectively couple first and second computer systems 102 and 104 to network 116, may include any number of communication links, including wired and/or wireless links, such as IEEE 802.11 wireless LAN (WLAN) wireless links, Worldwide Interoperability for Microwave Access (WiMAX) links, cellular network links, wireless personal area network (PAN) links (e.g., Bluetooth™ links), Ethernet links, USB links, etc.

Application 106 may issue a query for a resource (e.g., data). The resource may be accessible as data 108 contained in storage 118 at second computer system 104. To obtain the resource, first computer system 102 may transmit the query from first computer system 102 in a first communication signal 110. For example, first computer system 102 may contain an agent (e.g., a "client" agent) configured to handle transmission of queries. First communication signal 110 is transmitted through a first communication link 122, network 116, and a second communication link 124, and is received by second computer system 104. First communication signal 110 may be transmitted in any form, including in the form of a stream of packets (e.g., IP packets).

Second computer system 104 processes the request received in first communication signal 110. For example, second computer system 104 may include an agent (e.g., a "server" agent) configured to process received queries. Second computer system 104 retrieves data 108 from storage 118, which may contain a database or other data source. Second computer system 104 generates a second communication signal 112, which is a response signal that includes data 108. Second communication signal 112 is transmitted through second communication link 124, network 116, and first communication link 122, and is received by first computer system 102. Application 106 receives data 108 included in second communication signal 112, which may be stored in storage 114 (as indicated by dotted lines in FIG. 1). Second communication signal 112 may be transmitted in any form, including in the form of a stream of packets (e.g., IP packets).

Currently, applications and services are being developed that include the use of REST (representational state transfer) interfaces for accessing resources and a URI (Uniform Resource Identifier) namespace that identifies the resources. These applications and services enable web-based data sources to be accessed in a more efficient manner. For example, second computer system 104 in FIG. 1 may be configured to have a REST interface to enable data 108 to be accessed according a URI.

An example of such an application is the Microsoft® .NET Framework published by Microsoft Corporation of Redmond, Wash. The .NET Framework is a software framework providing a large library of coded solutions. The ADO.NET Data Services of the .NET Framework provide rules to expose an HTTP (hypertext transfer protocol) interface for a data source to receive queries, as well as an implementation of those rules in the form of a library or framework that developers may use to create services. Data of a data source can be accessed through such an interface using URIs. Second computer system 104 may be configured according to the ADO-.NET Data Services to provide an HTTP interface accessible using URIs.

Language integrated query (LINQ) is a Microsoft™ .NET Framework component that add querying capabilities to supported programming languages. When compiled, a LINQ query may be converted into an "expression tree" or other representation, such as an IL representation. A LINQ query may be translated directly into executable code or to a data structure representative of the executable code. In the case where the LINQ provider translates the LINQ query to a different format for execution (e.g., SQL, URIs, etc.), the LINQ query may be translated to the data structure representation by the compiler. An expression tree preserves the high level structure of the query and can be examined at runtime. The expression tree is provided to a LINQ provider, which is a data source-specific implementation that adapts the LINQ query to be used with the data source. For instance, during runtime, application 106 may generate a LINQ query in the form of an expression tree. A LINQ provider at first computer system 102 may adapt the LINQ query to be used with the data source at first computer system 102 or second computer system 104. Many types of data sources may be present. Providers capable of adapting LINQ queries to the many types of data sources may need to be present. The requirement to adapt the expression tree to be used with particular data sources causes additional effort and increases system complexity.

Embodiments of the present invention overcome such deficiencies in conventional data communication systems, enabling queries to be converted into a URI form formatted according to a convention agreed upon between clients and servers that may exchange queries. Examples of such embodiments are described below. Although for purposes of illustration the example embodiments provided below frequently are described with reference to LINQ queries, such embodiments may also apply and/or be adaptable to other types of queries, as would be known to persons skilled in the relevant art(s) from the teachings herein.

III. Example Embodiments

The example embodiments described herein are provided for illustrative purposes, and are not limiting. Furthermore, additional structural and operational embodiments, including modifications/alterations, will become apparent to persons skilled in the relevant art(s) from the teachings herein.

Embodiments enable queries, such as LINQ queries, to be translated into URIs, a standard addressing form that may be used to access data at REST-based data services, such as the ADO.NET Data Services provided by the Microsoft® .NET Framework. As a result, developers are enabled to generate applications capable of querying REST data sources according to their native programming language (e.g., a .NET language) without needing to be aware of the underlying URI syntax or semantics. For instance, embodiments are provided for translating LINQ query expressions to URIs that follow a pre-established convention. This enables users to generate applications capable of querying data from a RESTful system via .NET types and query operators.

RESTful systems (systems configured according to the REST architecture) expose data as resources and relationships between resources. In an embodiment, during a LINQ query expression to URI translation, LINQ expressions that are bound to .NET types are translated to LINQ expressions that are bound to types of resources. This process binds a LINQ query expression to REST resources.

Figure 2:
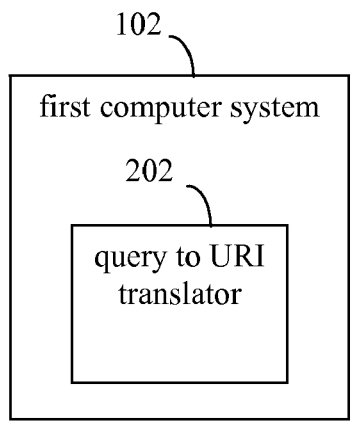
FIG. 2 shows a block diagram of a computer system that includes a LINQ query to URI translator, according to an example embodiment of the present invention.

FIG. 2 shows a block diagram of first computer system 102, according to an example embodiment. As shown in FIG. 2, first computer system 102 includes a query to URI translator 202. Query to URI translator 202 is a module and/or system configured to convert queries to URIs, such as LINQ queries. For example, query to URI translator 202 may be configured to translate queries generated by applications at first computer system 102 (e.g., application 106 shown in FIG. 1) to URIs. Query to URI translator 202 may be implemented in hardware, software, firmware, or any combination thereof. For example, query to URI translator 202 may be implemented as computer program code configured to be executed in one or more processors. Alternatively, query to URI translator 202 may be implemented as hardware logic/electrical circuitry. Furthermore, although shown in FIG. 1 as being implemented in first computer system 102, in another embodiment, query to URI translator 202 may instead by implemented in second computer system 104 to convert queries received at second computer system 104 into URIs. Query to URI translator 202 may be configured in various ways to perform its functions.

Figure 3:
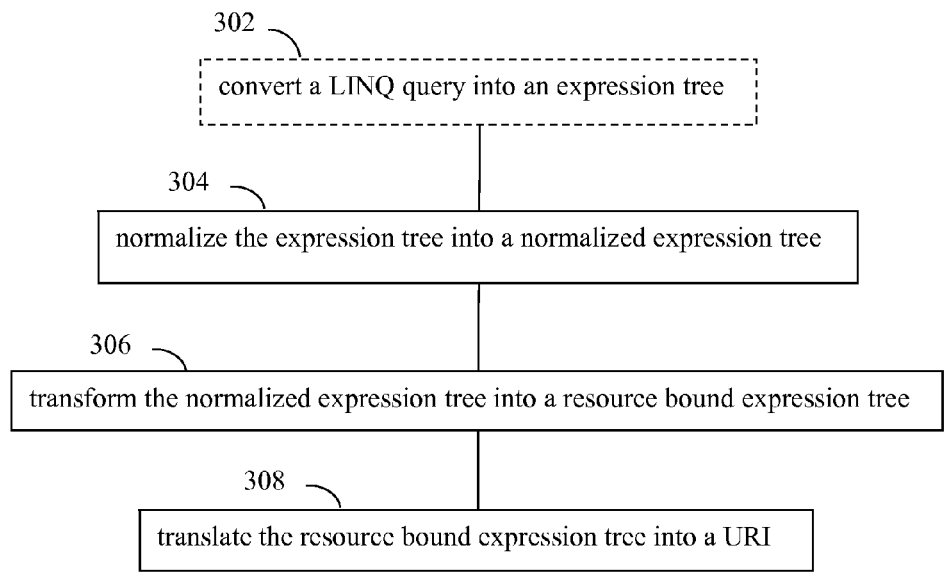
FIG. 3 shows a flowchart providing a process for translating LINQ queries to URIs, according to an example embodiment of the present invention.

For example, FIG. 3 shows a flowchart 300 providing a process for translating LINQ queries to URIs, according to an example embodiment. In an embodiment, a portion or the entirety of flowchart 300 may be performed by query to URI translator 202. Other structural and operational embodiments will be apparent to persons skilled in the relevant art(s) based on the discussion regarding flowchart 300. Flowchart 300 is described in detail in the following subsections.

A. Example Embodiments for Converting a Query to an Expression Tree

As shown in FIG. 3, flowchart 300 begins with step 302. In step 302, a LINQ query is converted into an expression tree. In embodiments, step 302 may be performed by query to URI translator 202 and/or by a compiler (included or not included in query to URI translator 202). For instance, in an embodiment, step 302 may be performed by a compiler that is separate from query to URI translator 202. In such an embodiment, step 302 may be performed during a compile time for an application (e.g., when application 106 of FIG. 1 is compiled), and steps 304, 306, and 308 may be performed separately from step 302 (e.g., later in time), in embodiments. For instance, 304, 306, and 308 may be performed one or more times during runtime for the application, in embodiments. For illustrative purposes, step 302 is described as follows as being performed by a compiler.

Figure 4:
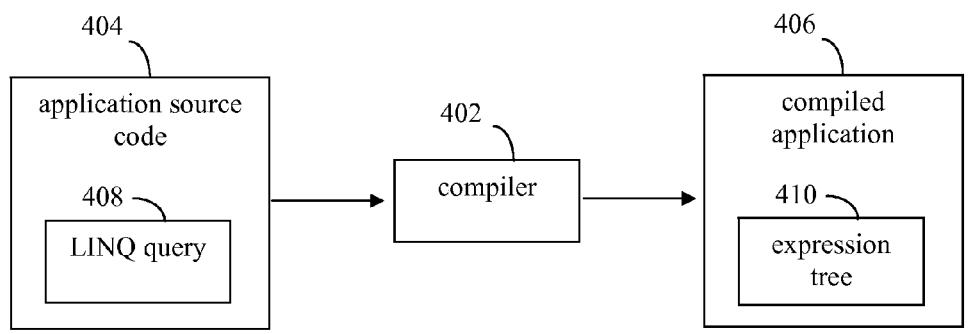
FIG. 4 shows a block diagram of an expression tree generation system, according to an example embodiment of the present invention.

For instance, FIG. 4 shows a block diagram of an application compiler system 400, according to an example embodiment. As shown in FIG. 4, system 400 includes a compiler 402. Compiler 402 may be configured to perform step 302. As shown in FIG. 4, compiler 402 receives an application source code 404, which contains a LINQ query 408. LINQ query 408 may be a query expression in application source code 404 formed of operators and predicates, as would be known to persons skilled in the relevant art(s). An example of LINQ query 408 is shown as follows (Example Query 1) (represented according to a query comprehension syntax in the C# programming language):

```
var query = from o in context.Orders
            where o.ID == 5
            from od in o.OrderDetails
            order by od.Price
            select od;
```

A query expression, such as Example Query 1 shown above, may include multiple "sub-expressions." For instance, each line of Example Query 1 shown above may contain one or more sub-expression of the query expression, and/or multiple lines of the query expression may together form a particular sub-expression. Although LINQ query 408 is shown above in the form of the C# programming language, LINQ query 408 may have the form of any other suitable programming language, including C++, VB (Visual Basic), etc. LINQ query 408 may have one or more associated classes that provide type information for elements of the query. For instance, the above example of LINQ query 408 may have an associated "Orders" class and "OrderDetail" class. An example of the "Orders" class is shown as follows:

```
class Orders {
    DateTime OrderDate;
    IList<OrderDetail> OrderDetails;
    int ID;
}
```

Compiler 402 compiles application source code 404 to generate a compiled application 406. When compiling application source code 404, compiler 402 converts LINQ query 408 into an expression tree 410. Expression tree 410 includes the high level structure of LINQ query 408. Techniques for converting LINQ query 408 into expression tree 410 are known to persons skilled in the relevant art(s). For instance, example techniques for converting a LINQ query into an expression tree are described in commonly assigned, co-pending U.S. Patent Appl. Publ. No. 2007/0271233, titled "A Generic Interface For Deep Embedding Of Expression Trees In Programming Languages," which is incorporated herein by reference in its entirety.

Example Query 1 is shown again as follows, with line number indications added for purposes of illustration:

| | |
|---|---|
| var query = from o in context.Orders | line #1 |
| where o.ID == 5 | line #2 |
| from od in o.OrderDetails | line #3 |
| order by od.Price | line #4 |
| select od; | line #5 |

Figure 5A:
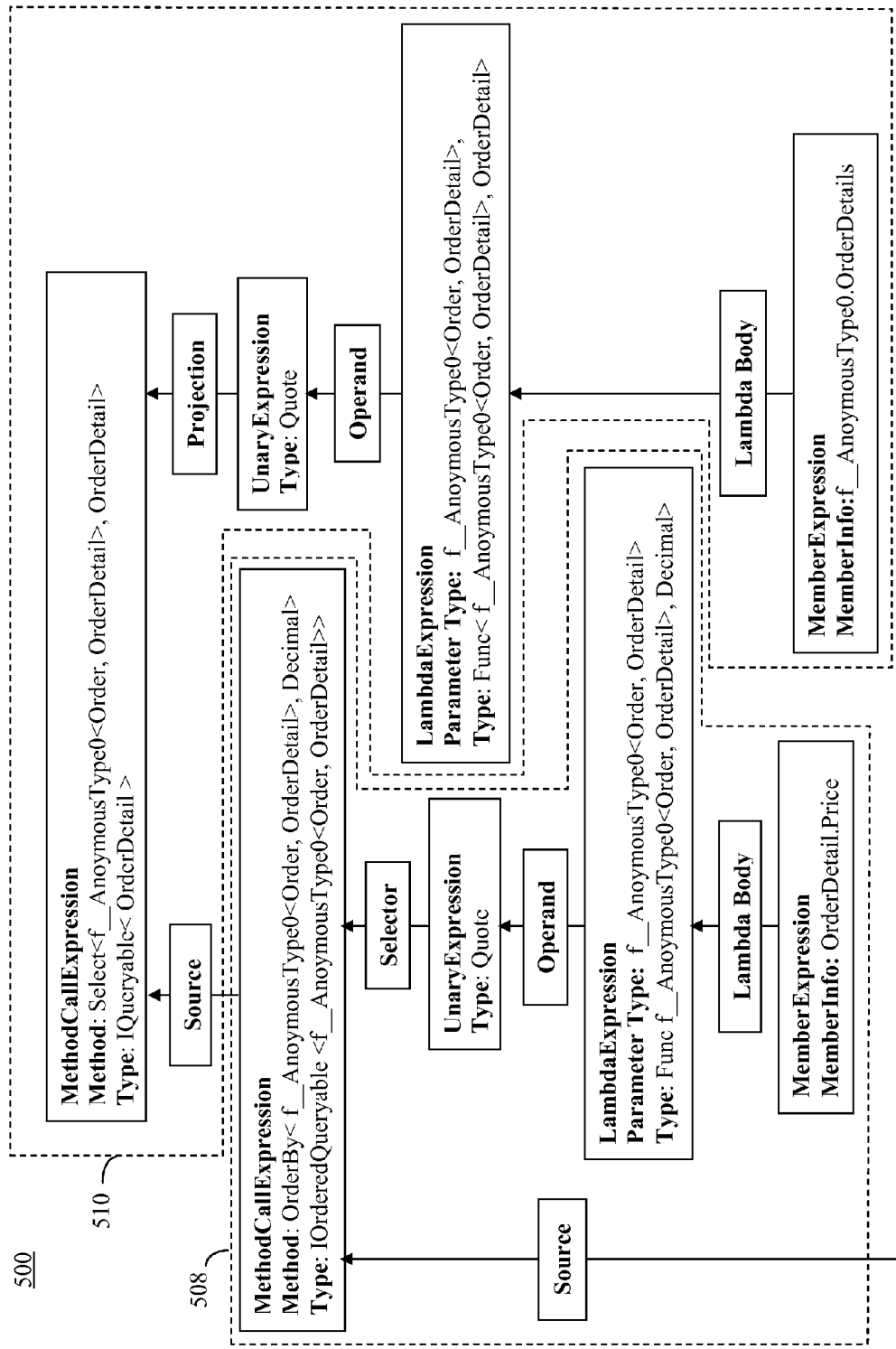
FIGS. 5A and 5B show a block diagram of an example expression tree.
Figure 5B:
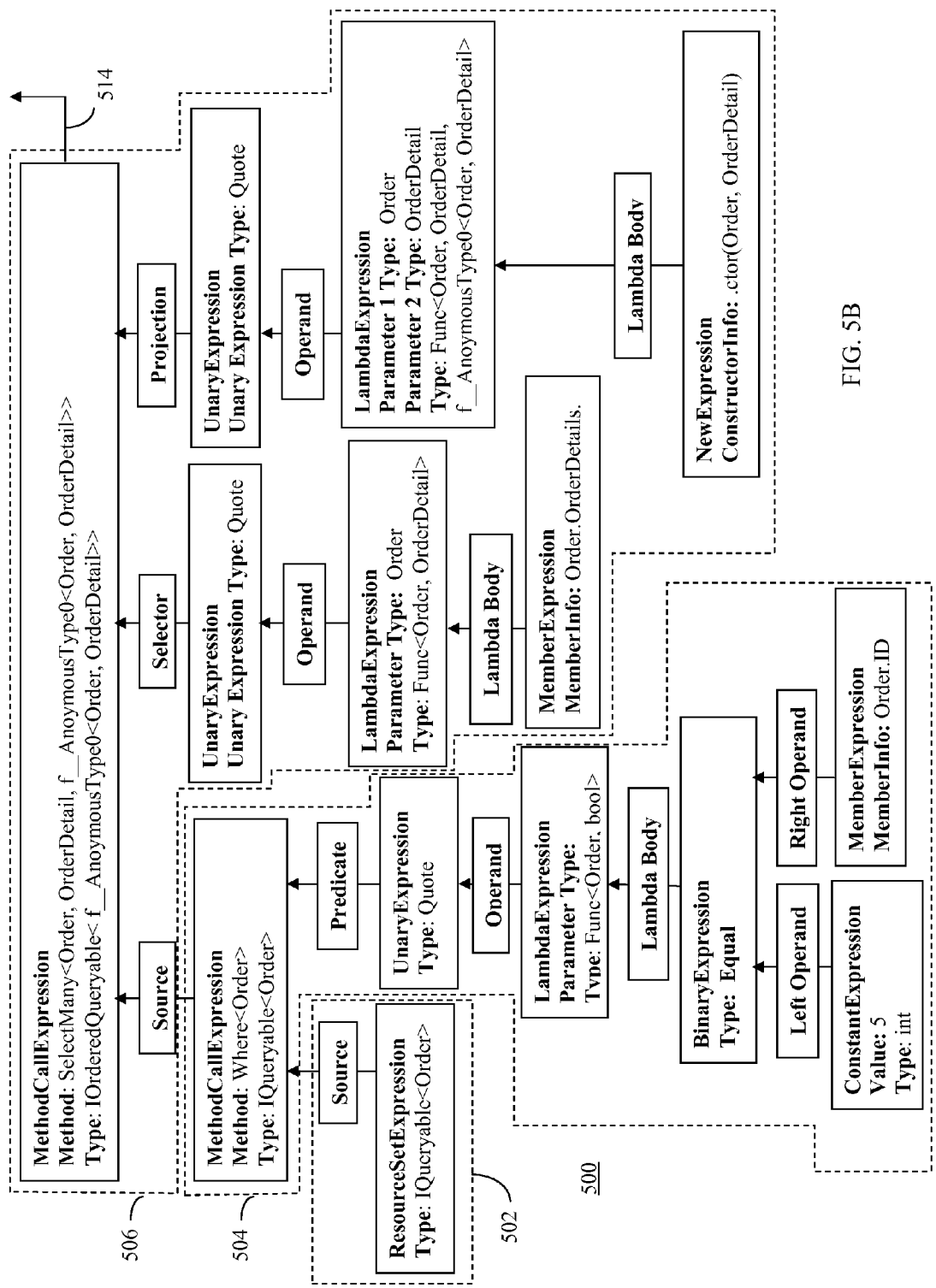

FIGS. 5A and 5B show a block diagram of an expression tree 500, which is an example of expression tree 410 that may be generated by compiler 402 based on Example Query 1. As shown in FIGS. 5A and 5B, expression tree 500 includes a plurality of nodes and connectors. Various nodes are present (e.g., such as a "UnaryExpresson Type: Quote" node) that each perform a respective function based on one or more inputs (e.g., that are received through connectors). The functions are defined by the portion of Example Query 1 implemented in the particular node. A plurality of types of connectors are present, including "source" connectors, "projection" connectors, "selector" connectors, "operand" connectors, "lambda body" connectors, and "predicate connectors," for example. Each connector is directional, and connects from a first node to a second node. It is noted that equivalent expression trees having different forms than expression tree 500 shown in FIGS. 5A and 5B may alternatively be generated to represent Example Query 1.

One or more nodes and connectors of expression tree 500 combine to form an implementation of each sub-expression of Example Query 1. For example, in the example of expression tree 500 shown in FIGS. 5A and 5B, tree portion 502 shown in FIG. 5B corresponds to line #1 of Example Query 1, tree portion 504 shown in FIG. 5B corresponds to line #2, tree portion 506 shown in FIG. 5B corresponds to line #3, tree portion 508 shown in FIG. 5A corresponds to line #4, and tree portion 510 shown in FIG. 5B corresponds to line #5. As shown in FIG. 5B, tree portion 502 includes one node and one connector, tree portion 504 includes six nodes and five connectors, and tree portion 506 includes seven nodes and seven connectors. As shown in FIG. 5A, tree portion 508 includes four nodes and four connectors, and tree portion 510 includes four nodes and four connectors. Note that a connector between a first node in a first tree portion and a second node in a second tree portion, such as a connector 514 shown in FIGS. 5A and 5B (connecting nodes in tree portions 506 and 508) may be considered to be included in either of the tree portions.

Compiler 402 may be implemented in hardware, software, firmware, or any combination thereof. For example, compiler 402 may be implemented as computer program code configured to be executed in one or more processors. Alternatively, compiler 402 may be implemented as hardware logic/electrical circuitry.

B. Example Embodiments for Normalizing an Expression Tree

Figure 6:
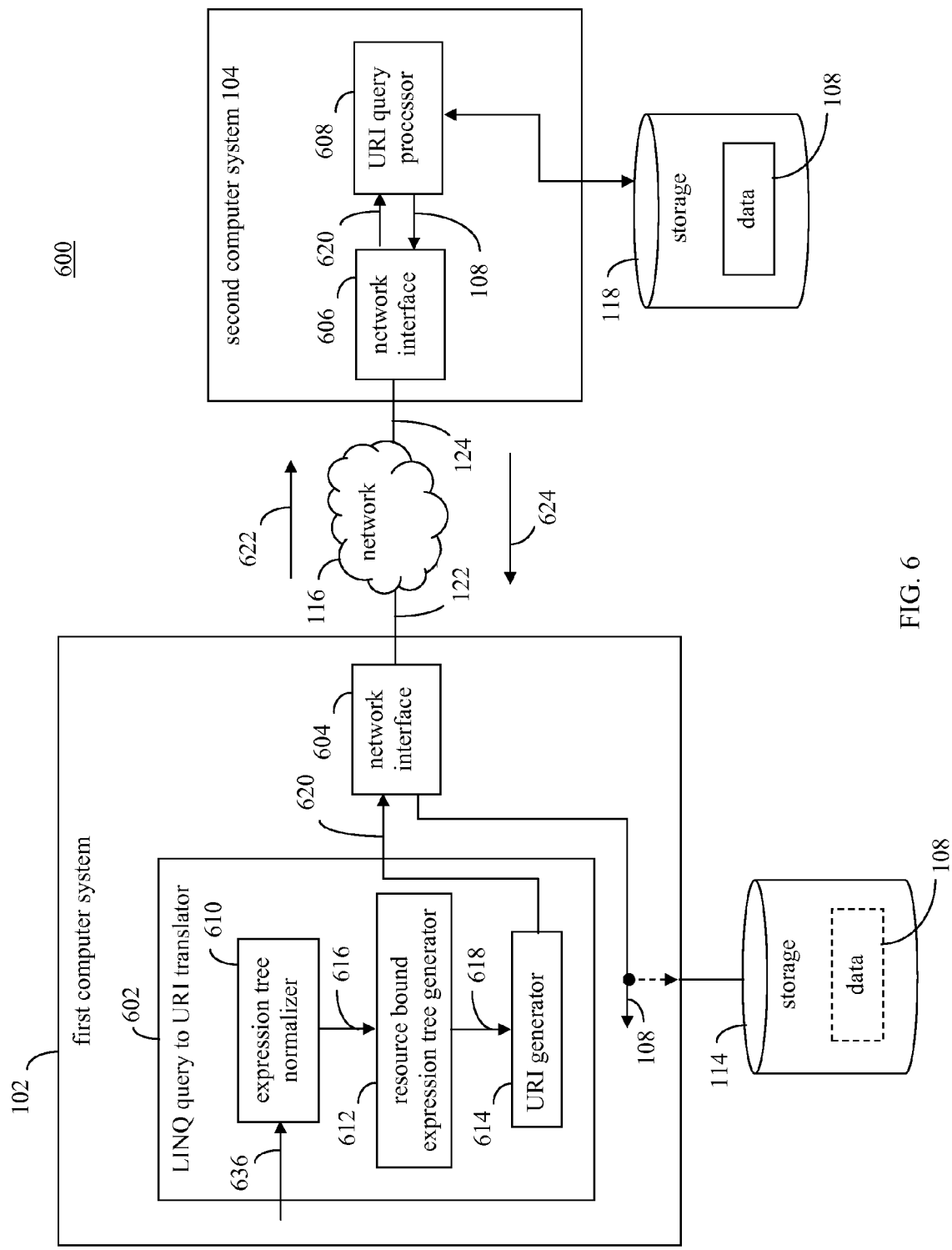
FIG. 6 shows a block diagram of a data communication system that includes a LINQ query to URI translator, according to an example embodiment of the present invention.

Referring back to flowchart 300 in FIG. 3, in step 304, the expression tree is normalized into a normalized expression tree. As described above, in an embodiment, steps 304, 306, and 308 may be performed during runtime for an application (e.g., runtime for compiled application 406 shown in FIG. 4), and may be considered to be an embodiment distinct from step 302. Step 304 may be performed by query to URI translator 202 shown in FIG. 2. For instance, FIG. 6 shows a block diagram of a data communication system 600 that includes a LINQ query to URI translator 602, according to an example embodiment. LINQ query to URI translator 602 is an example of query to URI translator 202 shown in FIG. 2. Data communication system 600 is similar to data communication system 100 shown in FIG. 1, with differences described as follows.

As shown in FIG. 6, system 600 includes first computer system 102, second computer system 104, first storage 114, network 116, and second storage 118. In the embodiment of FIG. 6, first computer system 102 includes a LINQ query to URI translator 602. LINQ query to URI translator 602 includes an expression tree normalizer 610, a resource bound expression tree generator 612, and a URI generator 614. In an embodiment, expression tree normalizer 610 may be configured to perform step 304.

As shown in FIG. 6, expression tree normalizer 610 receives an expression tree 636, which is runtime representation of expression tree 410 (FIG. 4). Expression tree normalizer 610 is configured to normalize expression tree 636 into a canonical form (e.g., a standard form that can be recognized by subsequent pattern matching). This normalizing may include one or more of eliminating language specific constructs (e.g., .NET language constructs) from expression tree 636, rewriting sub-expressions of expression tree 636 to canonical form, evaluating all sub-expressions of expression tree 636 that can be evaluated locally, and/or further normalization functions. Expression tree normalizer 610 generates a normalized expression tree 616. Normalized expression tree 616 is a canonical LINQ query expression tree that is equivalent to expression tree 636.

Figure 7:
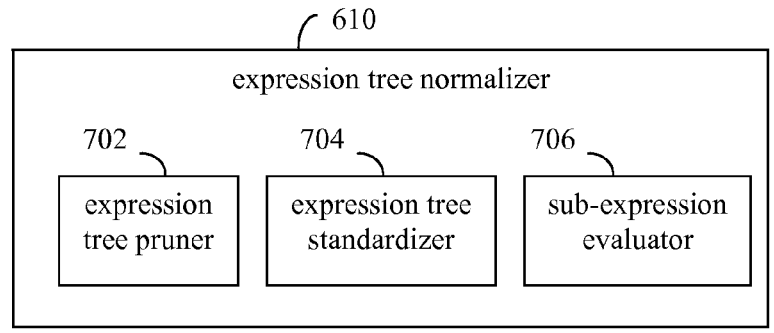
FIG. 7 shows a block diagram of an expression tree normalizer, according to an example embodiment of the present invention.
Figure 8:
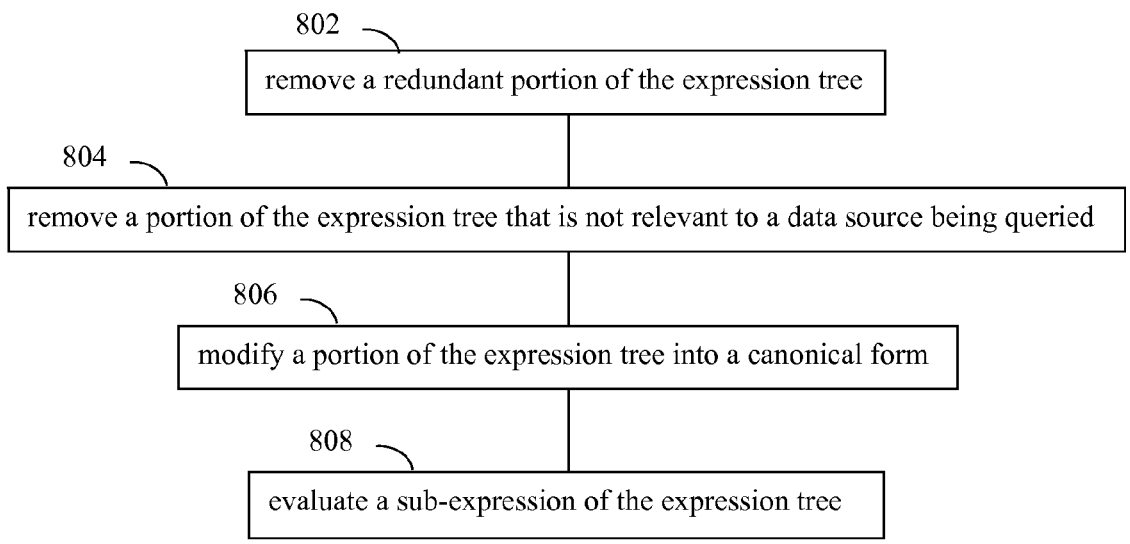
FIG. 8 shows a flowchart providing a process for normalizing an expression tree, according to an example embodiment of the present invention.

For instance, FIG. 7 shows a block diagram of expression tree normalizer 610, according to an example embodiment. As shown in FIG. 7, expression tree normalizer 610 includes an expression tree pruner 702, an expression tree standardizer 704, and a sub-expression evaluator 706. FIG. 8 shows a flowchart 800 providing a process for normalizing an expression tree (e.g., step 304 of FIG. 3), according to an example embodiment. In an embodiment, flowchart 800 may be performed by expression tree normalizer 610 shown in FIG. 7. Any one or more steps of flowchart 800 may be performed in an embodiment, and may be performed in any order. Flowchart 800 is described as follows.

Flowchart 800 begins with step 802. In step 802, a redundant portion of the expression tree is removed. For instance, in an embodiment, expression tree pruner 702 may be configured to remove one or more redundant portions of expression tree 636. Expression tree pruner 702 may be configured to remove redundant portions of expression tree 636 to reduce a complexity of expression tree 636. Note that in an embodiment, step 802 may alternatively be performed by a resource bound expression tree modifier described further below with respect to FIG. 10.

In step 804, a portion of the expression tree that is not relevant to a data source being queried is removed or replaced. For instance, in an embodiment, expression tree pruner 702 may be configured to remove one or more portions of expression tree 636 that are not relevant to the data source being queried (e.g., the data source at second computer system 104 in which data 108 is stored). Expression tree 636 may contain language specific constructs and/or sub-expressions that provide no semantic value with respect to the data source being queried, and their removal reduces a complexity of expression tree 636.

In step 806, a portion of the expression tree is modified into a canonical form. For instance, in an embodiment, expression tree standardizer 704 may be configured to modify one or more portions of expression tree 636 into a canonical form. Expression tree standardizer 704 may be configured to modify portions of expression tree 636 that may be expressed in different, but equivalent, forms into common forms. Expression trees may exist that have different forms, but are equivalent, and therefore can be represented by a same URI. Modifying expression tree 636 into a standardized form simplifies subsequent processing performed by LINQ query to URI translator 602.

In step 808, a sub-expression of the expression tree is evaluated. For instance, in an embodiment, sub-expression evaluator 706 may be configured to evaluate one or more sub-expressions of expression tree 636. In some cases, expression tree 636 may include one or more sub-expressions that are capable of being evaluated locally (e.g., at first computer system 1020. Sub-expression evaluator 706 may evaluate such sub-expressions to further reduce a complexity of expression tree 636. In some cases, expression tree 636 may include one or more uncorrelated sub-expressions that are capable of being evaluated locally, and replaced by a new sub-expression that is a constant expression (e.g., represented as a node in the tree).

Figure 9A:
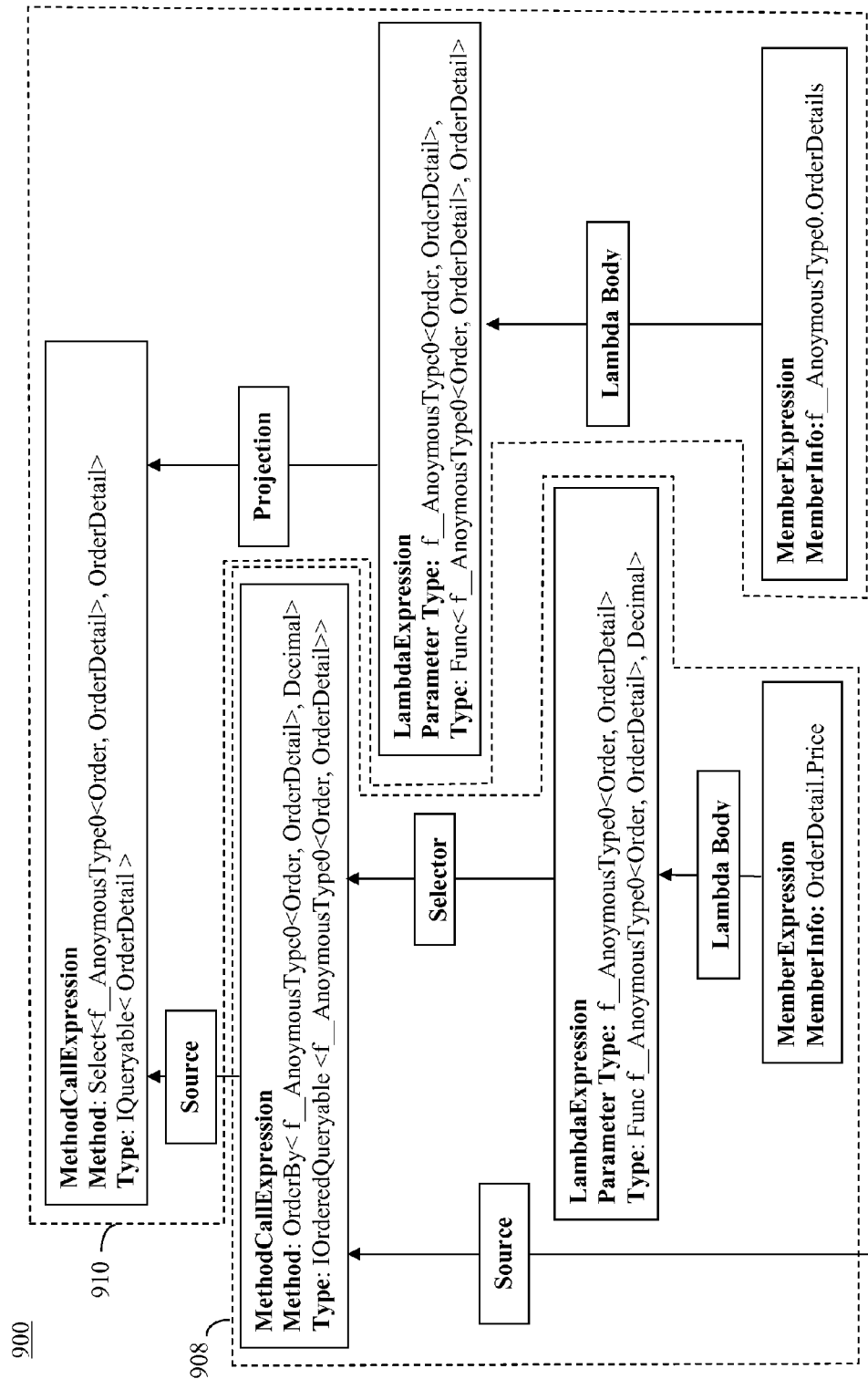
FIGS. 9A and 9B show a block diagram of a normalized expression tree, according to an example embodiment of the present invention.
Figure 9B:
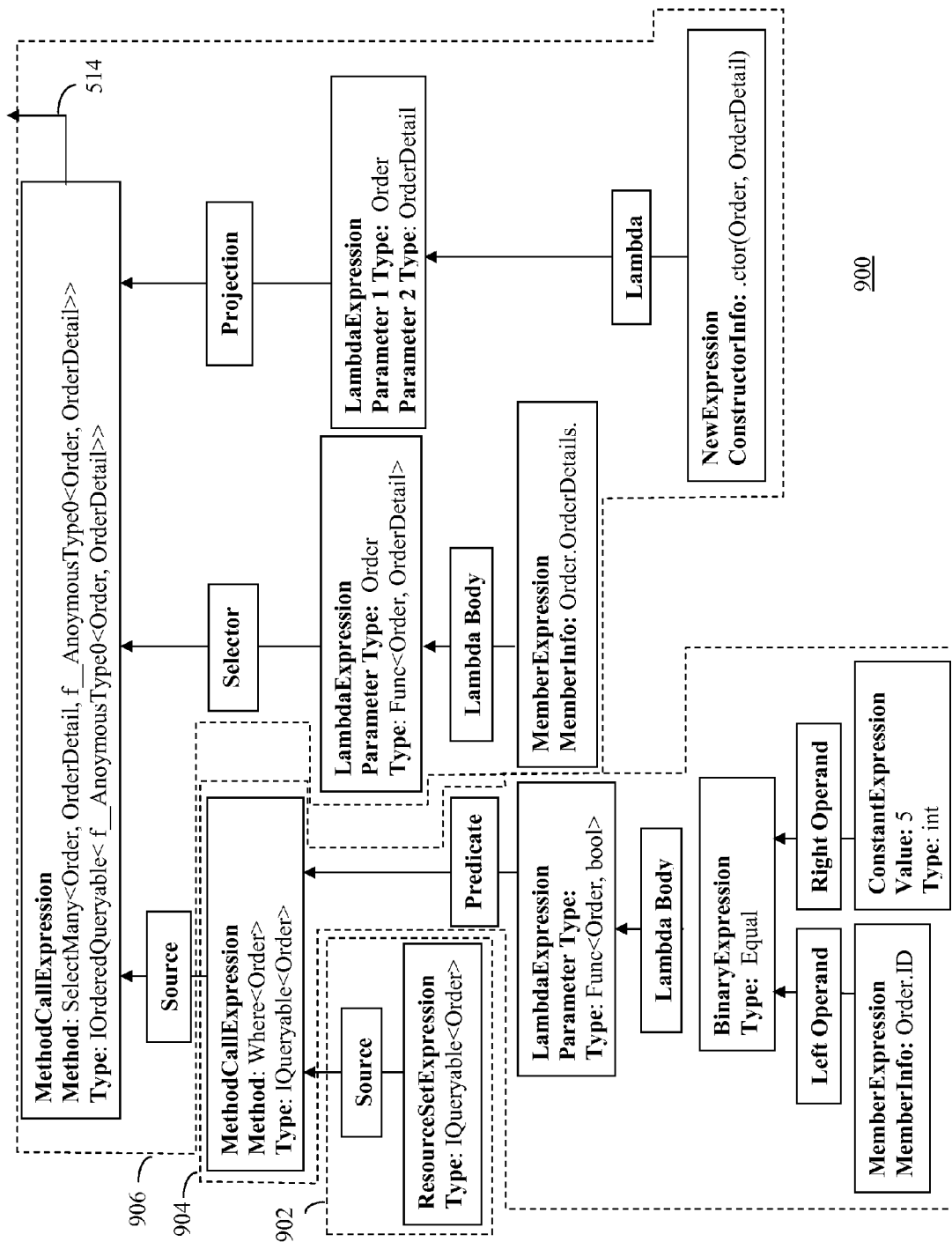

FIGS. 9A and 9B show a block diagram of a normalized expression tree 900, which is an example of normalized expression tree 616 that may be generated by expression tree normalizer 610 based on expression tree 500 shown in FIGS. 5A and 5B, in an example embodiment. As shown in FIGS. 9A and 9B, normalized expression tree 900 is similar to similar to expression tree 500 shown in FIGS. 5A and 5B, with differences described as follows. Normalized expression tree 900 includes tree portions 902-910, which correspond to tree portions 502-510 of expression tree 500. Tree portion 902 is the same as tree portion 502.

In the current example, expression tree normalizer 610 performed normalization of expression tree 500, including removing all nodes including a UnaryExpression of type Quote (e.g., according to step 804 of FIG. 8), which are extraneous to step 308 of flowchart 300 (FIG. 3). Thus, a UnaryExpression node was removed from each of tree portions 504, 508, and 510 to create corresponding tree portions 904, 908, and 910, and two UnaryExpression nodes were removed from tree portion 506 to create tree portion 906. Furthermore, expression tree normalizer 610 swapped operands of a BinaryExpression node of tree portion 504 so that a MemberExpression node is a left operand and a ConstantExpression node is a right operand (e.g., according to step 806 of FIG. 8) in tree portion 904.

C. Example Embodiments for Generating a Resource Bound Expression Tree

Referring back to flowchart 300 in FIG. 3, in step 306, the normalized expression tree is transformed into a resource bound expression tree. In an embodiment, resource bound expression tree generator 612 may be configured to perform step 306. As shown in FIG. 6, resource bound expression tree generator 612 receives normalized expression tree 616. Resource bound expression tree generator 612 is configured to generate a resource bound expression tree 618 based on normalized expression tree 616. When expression tree 636 (upon which normalized expression tree 616 is based) is generated at runtime, the language compilers (e.g., .NET language compilers) bind the query expression to a set of data types (e.g., .NET types) which are the targets of the LINQ query. Because URIs target resources and not data types, resource bound expression tree generator 612 is configured to translate the data type bound LINQ expression (normalized expression tree 616) into an equivalent resource bound expression tree (resource bound expression tree 618). The data type-to-URI resource translation performed by resource bound expression tree generator 612 may be performed using a predetermined mapping of the data type metadata to resource types and relationships.

Figure 10:
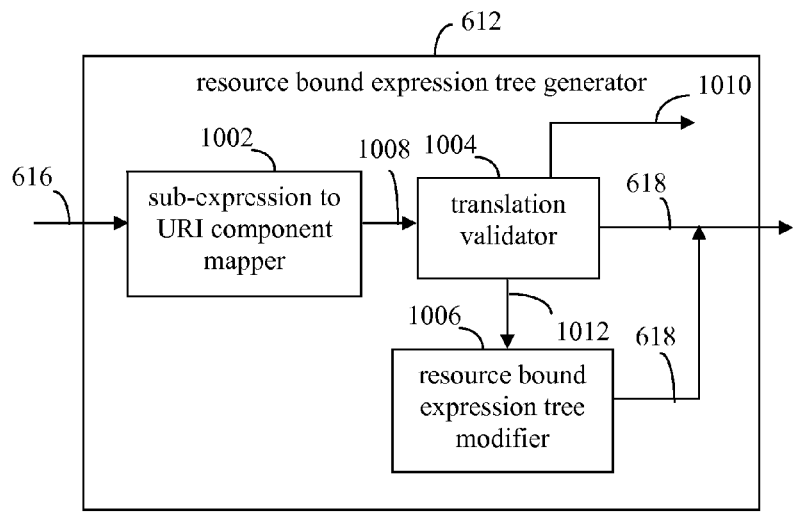
FIG. 10 shows a block diagram of a resource bound expression tree generator, according to an example embodiment of the present invention.
Figure 11:
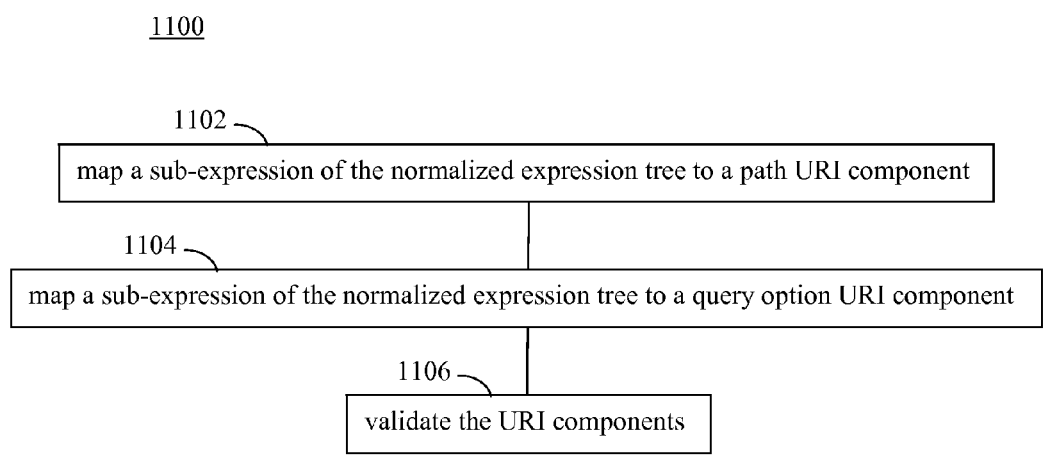
FIG. 11 shows a flowchart providing a process for generating a resource bound expression tree, according to an example embodiment of the present invention.

For instance, FIG. 10 shows a block diagram of resource bound expression tree generator 612, according to an example embodiment. As shown in FIG. 10, resource bound expression tree generator 612 includes a sub-expression to URI component mapper 1002, a translation validator 1004, and a resource bound expression tree modifier 1006. FIG. 11 shows a flowchart 1100 providing a process for generating a resource bound expression tree (e.g., step 306 of FIG. 3), according to an example embodiment. In an embodiment, flowchart 1100 may be performed by resource bound expression tree generator 612 shown in FIG. 10. Flowchart 1100 is described as follows.

Flowchart 1100 begins with steps 1102 and 1104, which are described together as follows. In step 1102, a sub-expression of the normalized expression tree is mapped to a path URI component. In step 1104, a sub-expression of the normalized expression tree is mapped to a query option URI component. As shown in FIG. 10, sub-expression to URI component mapper 1002 receives normalized expression tree 616. In an embodiment, sub-expression to URI component mapper 1002 may be configured to map one or more sub-expressions of normalized expression tree 616 to a path-related component or a query option-related component of the URI being generated. As shown in FIG. 10, sub-expression to URI component mapper 1002 generates a plurality of URI components 1008. URI components 1008 may be configured as resource bound expression tree 618 when translation validator 1004 is not present, or when translation validator 1004 validates URI components 1008.

For example, sub-expression to URI component mapper 1002 may use pattern matching to find sub-expressions of normalized expression tree 616 that can be translated to URI components, including path components of the URI (step 1102) or query option components of the URI (step 1104). In general, URI components are made up of two categories: (1) segments of the URI path, and (2) query options. Thus, in addition to resource bound expression tree generator 612 binding the LINQ query expression to specific resource types, mapper 1002 may be configured to identify a specific type of URI component represented by a specific sub-expression, a path URI component or query option URI component. This pattern matching may be driven by metadata mapping generated from the underlying CLR (common language runtime) types and a set of data service (e.g. Microsoft® ADO.NET Data Services) rules. For example, in addition to type mappings, a cardinality of relationships may be used by mapper 1002 to determine what kind of URI component a sub-expression is mapped to, and what is legal in context of the URI component.

Figure 12A:
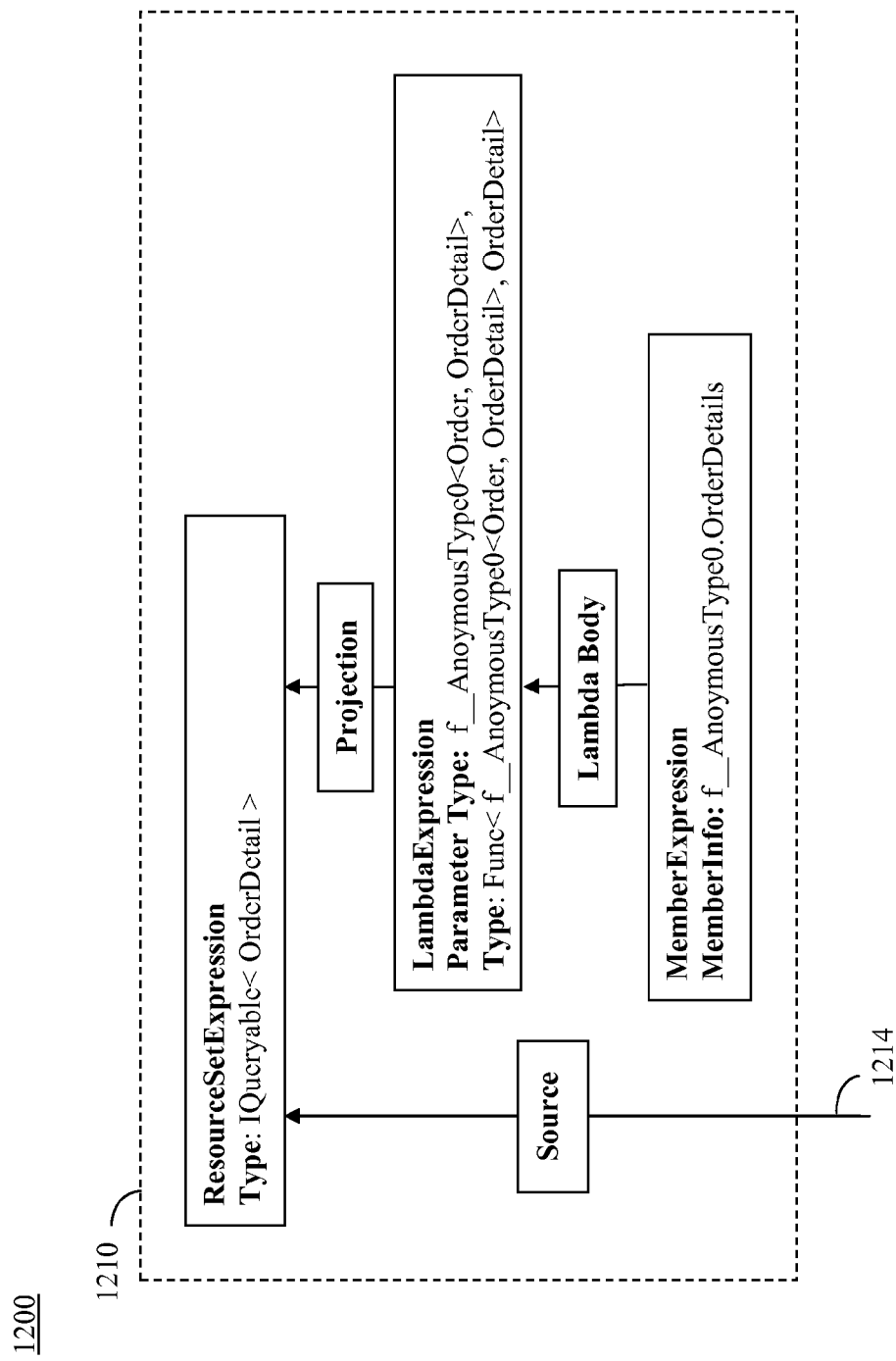
FIGS. 12A and 12B show a block diagram of a resource bound expression tree, according to an example embodiment of the present invention.
Figure 12B:
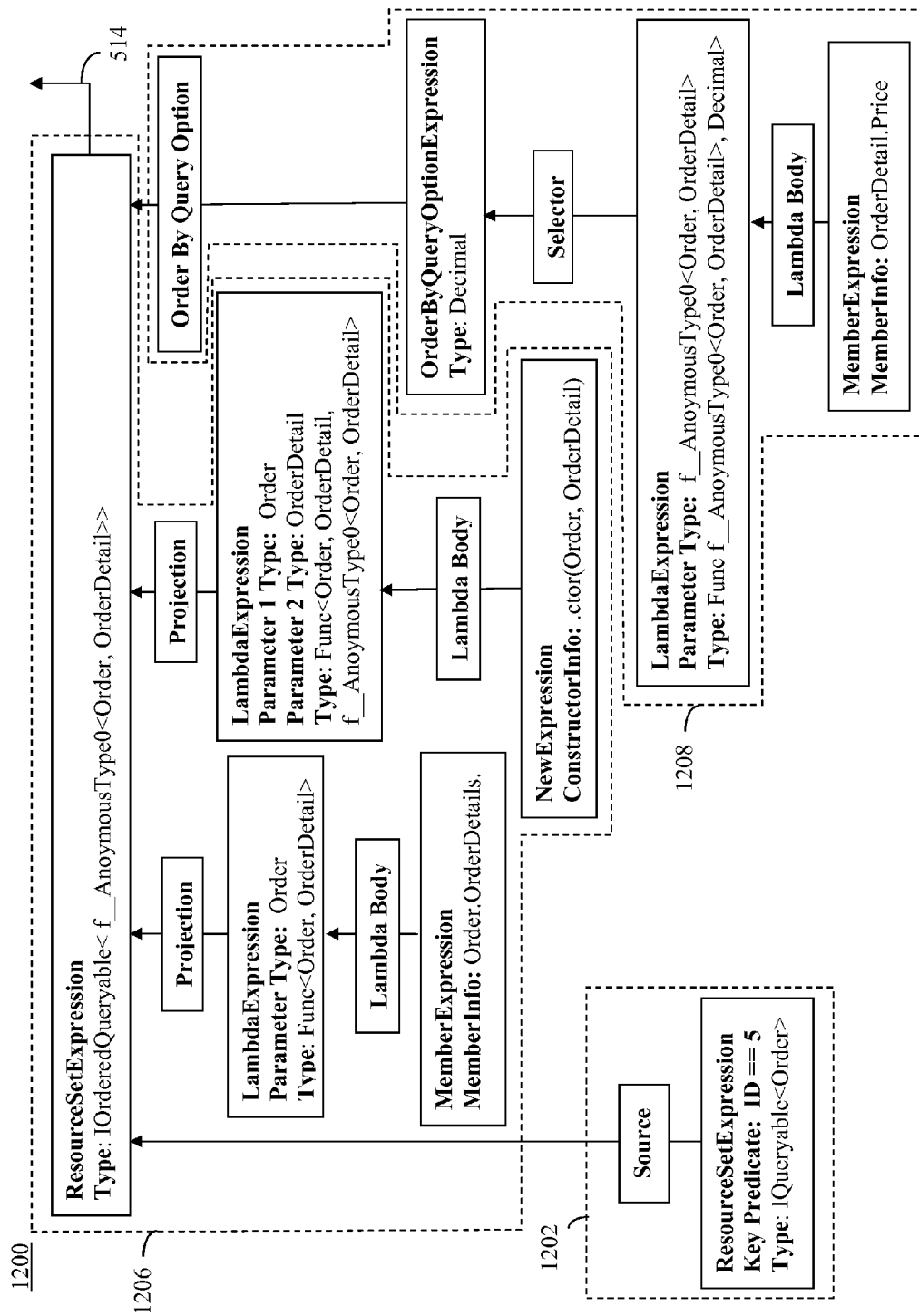

FIGS. 12A and 12B show a block diagram of a resource bound expression tree 1200, which is an example of resource bound expression tree 618 that may be generated by sub-expression to URI component mapper 1002 based on normalized expression tree 900 shown in FIGS. 9A and 9B. As shown in FIGS. 12A and 12B, resource bound expression tree 1200 is similar to similar to normalized expression tree 900 shown in FIGS. 12A and 12B, with differences described as follows. Resource bound expression tree 1200 includes tree portions 1202, 1206, 1208, and 1210. Tree portion 1202 corresponds to tree portions 902 and 904 of normalized expression tree 900, and tree portions 1206-1210 correspond to tree portions 906-910 of normalized expression tree 900.

In the current example, sub-expression to URI component mapper 1002 performed a mapping of normalized expression tree 900, including a translation of a sub-expression with the root node of MethodCallExpression (tree portion 904) into a key predicate for a source node of ResourceSetExpression (tree portion 902), because the predicate is testing equality between the key property and a constant, to generate tree portion 1202 shown in FIG. 12B. Furthermore, sub-expression to URI component mapper 1002 translated the sub-expression with the root node of MethodCallExpression (tree portion 906) into a ResourceSetExpression node because it projects a non-primitive property of the source ResourceSetExpression, to generate tree portion 1206 as shown in FIG. 12B. Still further, sub-expression to URI component mapper 1002 translated the MethodCallExpression node and its associated selector LambdaExpression node (tree portion 908) into an OrderByQueryoptionExpression node for a source ResourceSetExpression node, to generate tree portion 1208 shown in FIG. 12B. Still further, sub-expression to URI component mapper 1002 translated a MethodCallExpression node (tree portion 910) into a ResourceSetExpression node, because it projects a non-primitive property of the source ResourceSetExpression node, to generate tree portion 1210 shown in FIG. 12A.

Referring back to FIG. 11, in step 1106, the URI components are validated. Step 1106 is optional. In an embodiment, translation validator 1004 may be present to validate URI components 1008 generated by mapper 1002. Translation validator 1004 may be configured to validate that each URI component generated by mapper 1002 is a legal addition to the resource bound expression tree being generated by resource bound expression tree generator 612. If translation validator 1004 determines that a URI component is not legal, an error may be indicated and/or the resource bound expression tree may be identified as a candidate for being rewritten (as described in further detail below).

Figure 13:
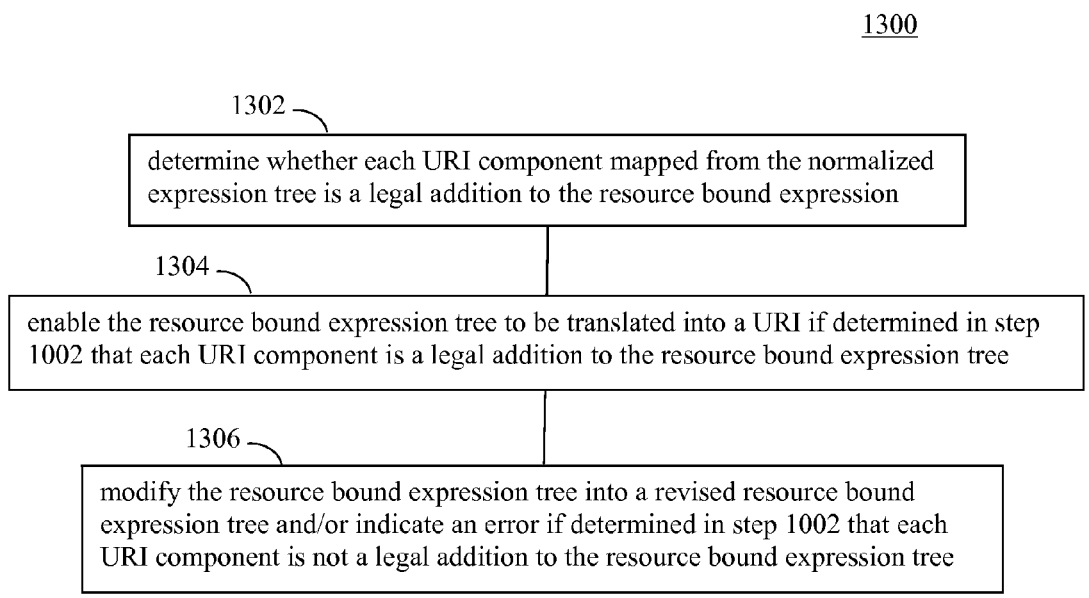
FIG. 13 shows a flowchart providing a process for validating a resource bound expression tree, according to an example embodiment of the present invention.

Translation validator 1004 may be configured in various ways to validate URI components. For example, in an embodiment, translation validator 1004 may perform flowchart 1300 shown in FIG. 13. In step 1302, whether each URI component mapped from the normalized expression tree is a legal addition to the resource bound expression tree is determined. Each URI component received in URI components 1008 is analyzed to determine whether the URI component is a legal addition to the resource bound expression tree being generated by resource bound expression tree generator 612.

For instance, the following example of a LINQ query (Example Query 2) includes sub-expressions which can each be translated to a corresponding URI component, which can be combined to form a complete URI:

```
var query = from c in myDataServiceContext.Customers
    where c.CustomerId == 'ALFKI'
    from o in c.Orders
    where o.Quantity > 100
    order by o.OrderDate
    select o;
```

An example of a complete URI that can be generated according to flowchart 300 (FIG. 3) from Example Query 2 shown above is shown as follows:

```
http://host/myservice/Customers("ALFKI")/Orders( )?$filter=Quantity gt 100&$orderby=Price
```

In contrast, the following example of a LINQ query (Example Query 3) cannot be translated into a URI because of three sub-expressions that cannot be mapped to corresponding URI components:

```
var query = from c in myDataServiceContext.Customers
    where c.CustomerId == 'ALFKI' && c.Age > 40
    order by c.Name
    from o in c.Orders
    where o.Quantity > 100
    select new {o.Quantity, o.OrderDate};
```

In Example Query 3, the "where c.CustomerId=='ALFKI' && c.Age>40" sub-expression cannot be mapped to a URI component. This is because in the path portion of the URI, predicates are only allowed over key properties and the only operator allowed is equality. The "order by c.Name" sub-expression cannot be mapped to a URI component. This is because the "order by" query operator is only allowed to reference the last type of resource type in the URI, which in this example is the "Orders" type. Furthermore, the "select new {o.Quantity, o.OrderDate}" sub-expression cannot be mapped to a URI component. The projection may not be able to be translated to a URI component because the URI syntax may not support projection of new types.

Thus, in an embodiment, if translation validator 1004 determines a URI component that allows a predicate over a property other than a key property, includes an operator other than an equality operator, and/or includes an illegal sub-expression mapping, the URI component is determined to not be an legal addition to the resource bound expression tree being generated by resource bound expression tree generator 612.

In step 1304, the resource bound expression tree is enabled to be translated into a URI if in step 1302 it is determined that each URI component is a legal addition to the resource bound expression tree. Referring to FIG. 10, if translation validator 1004 determines that each URI component received in URI components 1008 is a legal addition, translation validator 1004 generates resource bound expression tree 618, which is a combination of the received URI components.

In step 1306, the resource bound expression tree is modified into a revised resource bound expression tree and/or an error is indicated if in step 1302 it is determined that each URI component is not a legal addition to the resource bound expression tree. If translation validator 1004 determines that each URI component received in URI components 1008 is a not a legal addition, in an embodiment, translation validator 1004 may generate an error signal 1010. In addition, or alternatively, translation validator 1004 may provide the received URI components to resource bound expression tree modifier 1006 as an invalid resource bound expression tree 1012. Resource bound expression tree modifier 1006 may be configured to rewrite/convert invalid resource bound expression tree 1012 into a revised, valid resource bound expression tree, which may be output from resource bound expression tree modifier 1006 as resource bound expression tree 618.

To generate a legal version of invalid resource bound expression tree 1012, resource bound expression tree modifier 1006 may be configured to attempt to convert the one or more of the sub-expressions corresponding to the URI components determined to not be legal additions into equivalent, legal forms, that are pattern matching sub-expressions. For example, intermediate projections which introduce transient types can be eliminated if doing so does not change the meaning of the original LINQ query expression. If resource bound expression tree modifier 1006 is unsuccessful in performing a conversion for one or more of the sub-expressions, an error may be indicated (by resource bound expression tree modifier 1006 or by translation validator 1004).

Figure 14:
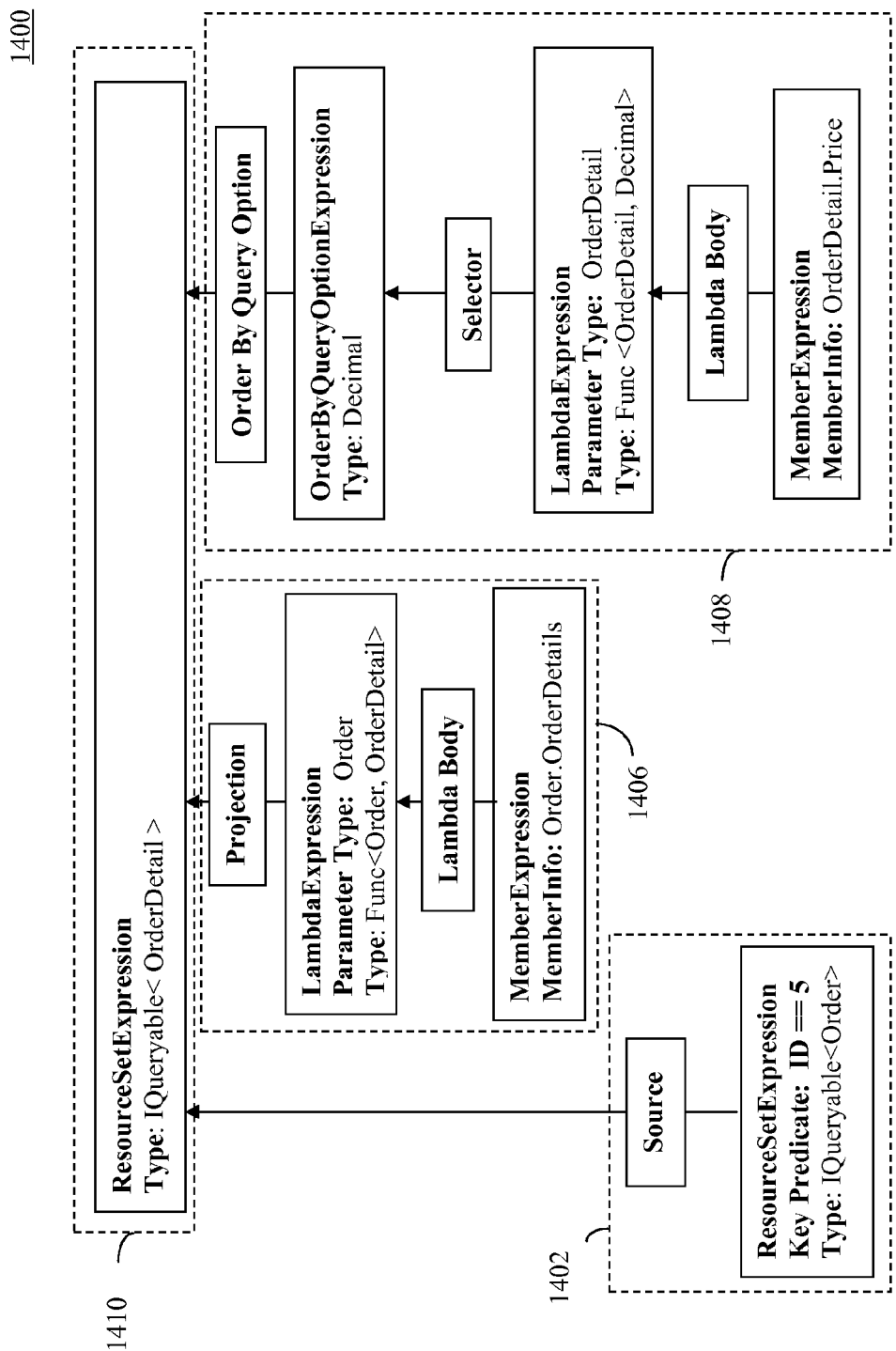
FIG. 14 shows a block diagram of a rewritten resource bound expression tree, according to an example embodiment of the present invention.

FIG. 14 shows a block diagram of a resource bound expression tree 1400, which is an example resource bound expression tree 618 that may be generated by resource bound expression tree modifier 1006 by modifying resource bound expression tree 1200 shown in FIGS. 12A and 12B, because of one or more illegal URI components. As shown in FIG. 14, resource bound expression tree 1400 is similar to similar to resource bound expression tree 1200, with differences described as follows. Resource bound expression tree 1400 includes tree portions 1402, 1406, 1408, and 1410, which correspond to tree portions 1202, 1206, 1208, and 1210 of resource bound expression tree 1200.

In the current example, resource bound expression tree modifier 1006 performed a modification of resource bound expression tree 1200, including removing a ResourceSetExpression node from tree portion 1206 because the type f_AnoymousType0<Order, OrderDetail> was determined not to be a legal entity type by translation validator 1004 based on metadata, to generate tree portion 1406 shown in FIG. 14. Furthermore, if this removal is successful, resource bound expression tree modifier 1006 rewrites an OrderByQueryOptionExpression selector LambdaExpression node (tree portion 1208) so the node only references the type of the ResourceSetExpression node (tree portion 1210), to generate tree portion 1408 shown in FIG. 14.

After completion of step 306, resource bound expression tree 618 is generated as a complete resource bound LINQ query expression that identifies all of the resources targeted by LINQ query 408. Resource bound expression tree 618 still contain sub-expressions which represent operators and simple expressions which can be directly translated to REST URI syntax later (in step 308). For example, a LINQ query predicate for a .NET type will be translated to a resource bound key predicate or a filter query option (based on the context of the sub-expression in the original LINQ expression) which is bound to the specific resource type but still contains the sub-expression for the predicate in terms of the native LINQ query expression representation.

D. Example Embodiments for Translating a Resource Bound Expression Tree to a URI Referring back to flowchart 300 in FIG. 3, in step 308, the resource bound expression tree is translated into a URI. In an embodiment, URI generator 614 may be configured to perform step 308. As shown in FIG. 6, URI generator 614 receives resource bound expression tree 618. URI generator 614 is configured to translate resource bound expression tree 618 to a URI, to generate URI 620. URI 620 is representative of LINQ query 408 (FIG. 4), in the form of a URI syntax. In an embodiment, URI generator 620 is configured to format URI 620 according to a URI syntax/convention that is shared between/commonly understood by first computer system 102 and second computer system 104, which may be a standardized URI format (e.g., defined according to the RFC 3986

Standard, published in January 2005 by The Internet Society), a proprietary URI format, or other URI format.

In an embodiment, URI generator 614 may be configured to translate resource bound expression tree 618 to a URI by traversing the expression tree of resource bound expression tree 618, and translating resource bound expression tree 618 to URI segments and/or query options, and translating sub-expressions of URI 620 to specific query option operations.

For example, with regard to Example Query 1 shown above, URI generator 614 may generate URI 620 as follows:

http://base/myservice/Orders(5)/
OrderDetails?$orderby=Price

Referring to resource bound expression tree 1400 shown in FIG. 14, URI generator 614 may generate the above URI from resource bound expression tree 1400 as follows: The "http://base/myservice/Orders(5)/" portion of the URI is generated from tree portion 1402, the "/OrderDetails?" portion of the URI is generated from tree portions 1406 and 1410, and the "$orderby=Price" portion of the URI is generated from tree portion 1408.

URI 620 may be used to query the data source at second computer system 104. As shown in FIG. 6, first computer system 102 includes a network interface 604, and second computer system 104 includes a network interface 606 and a URI query processor 608. URI 620 is received by network interface 604 from LINQ query to URI translator 602. Network interface 604 is configured to transmit a query in the form of URI 620 in a first communication signal 622 from first computer system 102. First communication signal 622 may transmitted from first computer system 102 through first communication link 122, network 116, and second communication link 124, to second computer system 104. First communication signal 622 may be transmitted in any form, including in the form of a stream of packets (e.g., IP packets). Network interface 606 of second computer system 104 receives first communication signal 622.

Network interface 606 extracts URI 620 from first communication signal 622, and URI 620 is received by URI query processor 608. URI query processor 608 is configured to process queries directed to an associated data source (e.g., a database that stores data in storage 118) in the form of URIs. For instance, URI query processor 608 may be configured as a RESTful interface, as would be known to persons skilled in the relevant art(s). URI 620 may be a request for a resource, such as data 108 stored in storage 118 associated with second computer system 104. In such an example, URI query processor 608 retrieves data 108 from storage 118 based on URI 620. As shown in FIG. 6, URI query processor 608 outputs data 108, which is received by network interface 606. Network interface 606 generates a second communication signal 624, which is a response signal that includes the requested data 108. Second communication signal 624 may be transmitted from second computer system 104 through second communication link 124, network 116, and first communication link 122, and is received by first computer system 102. Second communication signal 624 may be transmitted in any form, including in the form of a stream of packets (e.g., IP packets).

Second communication signal 624 is received by network interface 604 of first computer system 102. Second communication signal 624 includes data 108. Network interface 604 extracts data 108 from second communication signal 624. The extracted data 108 may be received by the requesting application (e.g., application 106 shown in FIG. 1) and/or may be stored in storage 114 (as indicated by dotted lines in FIG. 6).

Network interfaces 604 and 606 may each be any type of network interface (e.g., network interface card (NIC)), wired or wireless, such as an as IEEE 802.11 wireless LAN (WLAN) wireless interface, a Worldwide Interoperability for Microwave Access (Wi-MAX) interface, an Ethernet interface, a Universal Serial Bus (USB) interface, etc.

LINQ query to URI translator 602, expression tree normalizer 610, resource bound expression tree generator 612, URI generator 614, URI query processor 608, expression tree pruner 702, expression tree standardizer 704, sub-expression evaluator 706, sub-expression to URI component mapper 1002, translation validator 1004, and resource bound expression tree modifier 1006 may be implemented in hardware, software, firmware, or any combination thereof. For example, LINQ query to URI translator 602, expression tree normalizer 610, resource bound expression tree generator 612, URI generator 614, URI query processor 608, expression tree pruner 702, expression tree standardizer 704, sub-expression evaluator 706, sub-expression to URI component mapper 1002, translation validator 1004, and/or resource bound expression tree modifier 1006 may be implemented as computer program code configured to be executed in one or more processors. Alternatively, LINQ query to URI translator 602, expression tree normalizer 610, resource bound expression tree generator 612, URI generator 614, URI query processor 608, expression tree pruner 702, expression tree standardizer 704, sub-expression evaluator 706, sub-expression to URI component mapper 1002, translation validator 1004, and/or resource bound expression tree modifier 1006 may be implemented as hardware logic/electrical circuitry.

III. Further Example Embodiments

FIG. 15 depicts an exemplary implementation of a computer 1500 in which embodiments of the present invention may be implemented. For instance, first and second computer systems 102 and 104 may be implemented similarly to computer 1500, and may include one or more features of computer 1500 and/or alternative features. Computer 1500 may be a general-purpose computing device in the form of a conventional personal computer, a mobile computer, or a workstation, for example, or computer 1500 may be a special purpose computing device. The description of computer 1500 provided herein is provided for purposes of illustration, and is not intended to be limiting. Embodiments of the present invention may be implemented in further types of computer systems, as would be known to persons skilled in the relevant art(s).

As shown in FIG. 15, computer 1500 includes a processing unit 1502, a system memory 1504, and a bus 1506 that couples various system components including system memory 1504 to processing unit 1502. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computer 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1530, one or more application programs 1532, other program modules 1534, and program data 1536. Application programs 1532 or program modules 1534 may include, for example, computer program logic for implementing query to URI translator 202, compiler 402, LINQ query to URI translator 602, expression tree normalizer 610, resource bound expression tree generator 612, URI generator 614, URI query processor 608, expression tree pruner 702, expression tree standardizer 704, sub-expression evaluator 706, sub-expression to URI component mapper 1002, translation validator 1004, resource bound expression tree modifier 1006, flowchart 300, flowchart 800, flowchart 1100, and/or flowchart 1300 (including any step of flowcharts 300, 800, 1100, and 1300), and/or any further embodiments as described above.

A user may enter commands and information into the computer 1500 through input devices such as keyboard 1538 and pointing device 1540. Other input devices (not shown) may include a microphone, joystick, game pad, satellite dish, scanner, or the like. These and other input devices are often connected to the processing unit 1502 through a serial port interface 1542 that is coupled to bus 1506, but may be connected by other interfaces, such as a parallel port, game port, or a universal serial bus (USB).

A monitor 1544 or other type of display device is also connected to bus 1506 via an interface, such as a video adapter 1546. In addition to the monitor, computer 1500 may include other peripheral output devices (not shown) such as speakers and printers.

Computer 1500 is connected to a network 1548 (e.g., the Internet) through a network adaptor or interface 1550, a modem 1552, or other means for establishing communications over the network. Modem 1552, which may be internal or external, is connected to bus 1506 via serial port interface 1542.

As used herein, the terms "computer program medium" and "computer-readable medium" are used to generally refer to media such as the hard disk associated with hard disk drive 1514, removable magnetic disk 1518, removable optical disk 1522, as well as other media such as flash memory cards, digital video disks, random access memories (RAMs), read only memories (ROM), and the like.

As noted above, computer programs and modules (including application programs 1532 and other program modules 1534) may be stored on the hard disk, magnetic disk, optical disk, ROM, or RAM. Such computer programs may also be received via network interface 1550 or serial port interface 1542. Such computer programs, when executed or loaded by an application, enable computer 1500 to implement features of embodiments of the present invention discussed herein. Accordingly, such computer programs represent controllers of the computer 1500.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a first computer system, comprising:
normalizing an expression tree that is representative of a query into a normalized expression tree;
transforming the normalized expression tree into a resource bound expression tree by
mapping a first sub-expression of the normalized expression tree to a first uniform resource indicator (URI) component,
mapping a second sub-expression of the normalized expression tree to a second URI component, and
validating the first and second URI components by determining whether each URI component mapped from a sub-expression of the normalized expression tree is a legal addition to the resource bound expression tree; and
translating the resource bound expression tree into a URI formatted according to a convention shared between the first computer system and a second computer system configured to respond to the URI in response to a determination that each URI component is a legal addition to the resource bound expression tree.

2. The method of claim 1, wherein said normalizing comprises performing at least one of
removing a redundant first portion of the expression tree,
removing a second portion of the expression tree that is not relevant to a data source to which the query is directed,
modifying a third portion of the expression tree into a canonical form, or
evaluating a sub-expression of the expression tree.

3. The method of claim 1, further comprising:
modifying the resource bound expression tree into a revised resource bound expression tree if at least one URI component is determined to not be a legal addition to the resource bound expression tree, the revised resource bound expression tree including at least one revised sub-expression corresponding to a URI component determined to not be a legal addition to the resource bound expression tree.

4. The method of claim 1, wherein said validating further comprises:
indicating an error if at least one URI component is determined to not be a legal addition to the resource bound expression tree.

5. A system, comprising:
   at least one memory;
   an expression tree normalizer that receives an expression tree that is representative of a query, and is configured to normalize the expression tree that is representative of a query into a normalized expression tree;
   a resource bound expression tree generator configured to transform the normalized expression tree into a resource bound expression tree, the resource bound expression tree generator including
      a sub-expression to uniform resource indicator (URI) component mapper configured to map a first sub-expression of the normalized expression tree to a first URI component, and to map a second sub-expression of the normalized expression tree to a second URI component, and
      a translation validator configured to validate the first and second URI components, to determine whether each URI component mapped from a sub-expression of the normalized expression tree is a legal addition to the resource bound expression tree, and to enable translation of the resource bound expression tree into a URI if each URI component is determined to be a legal addition to the resource bound expression tree; and
   a URI generator configured to translate the resource bound expression tree into a URI formatted according to a convention shared between a first computer system configured to transmit the URI and a second computer system configured to respond to the URI.

6. The system of claim 5, wherein the expression tree normalizer comprises at least one of
   an expression tree pruner configured to remove a redundant first portion of the expression tree, and to remove a second portion of the expression tree that is not relevant to a data source to which the query is directed,
   an expression tree standardizer configured to modify a third portion of the expression tree into a canonical form, or
   a sub-expression evaluator configured to evaluate a sub-expression of the expression tree.

7. The system of claim 6, further comprising:
   a resource bound expression tree modifier configured to modify the resource bound expression tree into a revised resource bound expression tree if at least one URI component is determined to not be a legal addition to the resource bound expression tree, the revised resource bound expression tree including at least one revised sub-expression corresponding to a URI component determined to not be a legal addition to the resource bound expression tree.

8. The system of claim 6, wherein the translation validator is configured to indicate an error if at least one URI component is determined to not be a legal addition to the resource bound expression tree.

9. The system of claim 5, wherein the query is a LINQ (language integrated query) query.

10. A computer program product comprising a computer-readable memory having computer program logic recorded thereon for enabling a processor to convert a query to a uniform resource indicator (URI), comprising:
   first computer program logic for enabling the processor to normalize an expression tree that is representative of a query into a normalized expression tree;
   second computer program logic for enabling the processor to transform the normalized expression tree into a resource bound expression tree, the second computer program logic including
      fourth computer program logic for enabling the processor to map a first sub-expression of the normalized expression tree to a first URI component;
      fifth computer program logic for enabling the processor to map a second sub-expression of the normalized expression tree to a second URI component; and
      sixth computer program logic for enabling the processor to validate the first and second URI components, the sixth computer program logic including
         computer program logic for enabling the processor to determine whether each URI component mapped from a sub-expression of the normalized expression tree is a legal addition to the resource bound expression tree; and
         computer program logic for enabling the processor to enable translation of the resource bound expression tree into the URI if each URI component is determined to be a legal addition to the resource bound expression tree; and
   third computer program logic for enabling the processor to translate the resource bound expression tree into a URI formatted according to a convention shared between a first computer system configured to transmit the URI and a second computer system configured to respond to the URI in response to a determination that each URI component is a legal addition to the resource bound expression tree.

11. The computer program product of claim 10, wherein the first computer program logic includes
   computer program logic for enabling the processor to remove a redundant portion of the expression tree.

12. The computer program product of claim 10, further comprising:
   computer program logic for enabling the processor to modify the resource bound expression tree into a revised resource bound expression tree if at least one URI component is determined to not be a legal addition to the resource bound expression tree, the revised resource bound expression tree including at least one revised sub-expression corresponding to a URI component determined to not be a legal addition to the resource bound expression tree.

13. The computer program product of claim 10, wherein the sixth computer program logic further comprises:
   computer program logic for enabling the processor to indicate an error if at least one URI component is determined to not be a legal addition to the resource bound expression tree.

14. A query to uniform resource indicator (URI) translator system, comprising:
   at least one memory;
   a compiler configured to convert a language integrated query (LINQ) into an expression tree;
   an expression tree normalizer configured to normalize the expression tree into a normalized expression tree, the expression tree normalizer including
      an expression tree pruner configured to remove a redundant first portion of the expression tree and to remove a second portion of the expression tree that is not relevant to a data source to which the query is directed, and an expression tree standardizer configured to modify a third portion of the expression tree into a canonical form;

a resource bound expression tree generator configured to transform the normalized expression tree into a resource bound expression tree; and a URI generator configured to translate the resource bound expression tree into a URI formatted according to a convention shared between a first computer system configured to transmit the URI and a second computer system configured to respond to the URI.

15. The computer program product of claim 14, wherein the first computer program logic includes computer program logic for enabling the processor to remove a redundant portion of the expression tree.

16. The method of claim 1, wherein the query is a LINQ (language integrated query) query.

17. The computer program product of claim 10, wherein the query is a LINQ (language integrated query) query.

18. The computer program product of claim 10, wherein the first computer program logic includes computer program logic for enabling the processor to remove a portion of the expression tree that is not relevant to a data source to which the query is directed.

19. The computer program product of claim 10, wherein the first computer program logic includes computer program logic for enabling the processor to modify a portion of the expression tree into a canonical form.

20. A query to URI (uniform resource indicator) translator system, comprising:

at least one memory;

a compiler configured to convert a LINQ (language integrated query) into an expression tree;

an expression tree normalizer configured to normalize the expression tree into a normalized expression tree, the expression tree normalizer including an expression tree pruner configured to remove a redundant first portion of the expression tree and to remove a second portion of the expression tree that is not relevant to a data source to which the query is directed, and an expression tree standardizer configured to modify a third portion of the expression tree into a canonical form;

a resource bound expression tree generator configured to transform the normalized expression tree into a resource bound expression tree; and a URI generator configured to translate the resource bound expression tree into a URI formatted according to a convention shared between a first computer system configured to transmit the URI and a second computer system configured to respond to the URI.

* * * * *